United States Patent [19]

Solberg, Jr.

[11] Patent Number: 5,442,960
[45] Date of Patent: Aug. 22, 1995

[54] MEASUREMENT OF MASS USING ANGULAR SIMPLE HARMONIC MOTION

[75] Inventor: Ruell F. Solberg, Jr., San Antonio, Tex.

[73] Assignee: Southwest Research Institute, San Antonio, Tex.

[21] Appl. No.: 98,789

[22] Filed: Jul. 28, 1993

[51] Int. Cl.[6] .............................................. G01G 3/16
[52] U.S. Cl. ...................................................... 73/580
[58] Field of Search ......................... 73/580, DIG. 1; 177/210 FP, 210 R

[56] References Cited

U.S. PATENT DOCUMENTS

| | | | |
|---|---|---|---|
| 2,694,310 | 11/1954 | Pounds | 73/580 |
| 3,323,370 | 6/1967 | Green et al. | 73/172 |
| 3,492,858 | 2/1970 | Heflinger et al. | 73/580 |
| 3,555,886 | 1/1971 | Thornton | 73/580 |
| 3,565,193 | 2/1971 | Wirth | 177/1 |
| 3,926,271 | 12/1975 | Patashnick | 73/580 |
| 3,988,933 | 11/1976 | Fletcher et al. | 73/865 |
| 4,158,395 | 6/1979 | Brown | 177/210 FP |
| 4,249,411 | 2/1981 | Pearson | 73/12.01 |
| 4,274,501 | 6/1981 | Gallo et al. | 177/210 FP |
| 4,391,338 | 7/1983 | Patashnick et al. | 177/210 FP |
| 4,405,024 | 9/1983 | Fraval et al. | 177/200 |
| 4,429,574 | 2/1984 | Barry et al. | 73/580 |
| 4,696,181 | 9/1987 | Rupprecht | 73/580 |
| 4,838,371 | 6/1989 | Rupprecht et al. | 177/210 FP |

Primary Examiner—Hezron E. Williams
Assistant Examiner—Christine K. Oda
Attorney, Agent, or Firm—Baker & Botts

[57] ABSTRACT

A device for measuring the masses of objects in any gravity environment, including microgravity or zero gravity. Objects are placed on a platform having a torque restoring means. The platform is rotated from an equilibrium position and released, such that it undergoes angular simple harmonic motion. The device measures the period of oscillation which is used to calculate the mass of the object on the platform.

32 Claims, 2 Drawing Sheets 5,442,960

MEASUREMENT OF MASS USING ANGULAR SIMPLE HARMONIC MOTION

TECHNICAL FIELD OF THE INVENTION

This invention generally pertains to devices which measure the masses of objects. It more particularly relates to a device and method which can also be used in environments with gravity different from that on planet Earth.

BACKGROUND OF THE INVENTION

In terms of classical physics, "mass" is a measure of inertia, i.e., it is a measure of the opposition that a body offers to any attempts at changing its state of motion. The greater the mass of a body, the lower its acceleration under the action of an applied force.

On Earth, the mass of a body can be determined by measuring its weight, where weight is the gravitational force acting on the body. If the acceleration due to Earth's gravity, a, and the weight, F, are known, the mass, m, can be determined from Newton's second law of motion, which in equation form is $F=ma$.

A problem with conventional methods of obtaining mass by measuring weight for some conditions is that they require gravity, that is, a condition of not being "weightless". In environments where the acceleration of gravity is apparently zero, such as in a spacecraft orbiting Earth, where it is zero, such as deep in intergalactic space, or where it is not the standard value, such as on the Moon, some means for measuring mass other than the typical, conventional methods of measuring weight on Earth must be used. Note that mass is defined in classical physics in such a way that a given body has a value which remains constant under all of the conditions described above.

Equipment is in use today for measuring mass under microgravity conditions, such as during space travel. One type of such equipment is a simple spring mass system, wherein the object whose mass is to be measured is oscillated. The relationship between the mass of the object and the period of oscillation is used to obtain the mass value, using the principle that for a spring mass oscillating system, the square of the period is related to the mass and the spring constant of the spring. A second type of such equipment imparts angular motion to a fluid by a rotary impeller in a housing. The rotation of the fluid creates centrifugal forces and fluid pressures. The centrifugal pressure is measured with a pressure transducer and converted to a mass value.

A problem with existing systems for measuring mass under microgravity conditions is that they require calibration using a large number of known masses over the measurement range. For example, reasonable approximations can be obtained with the spring mass system if it is assumed to be a single degree of freedom oscillator and an ideal linear relationship exists between the square of the period of oscillation and the mass of the object. However, over even small mass ranges of the equipment that relationship varies from the ideal sufficiently that errors prevent achieving consistently high accuracy. So, the variations from the ideal can be reduced by an increase of the number of calibration masses.

Similar problems exist for the rotary impeller system in that there are variations about the expected linear relationship between mass and pressure. Therefore, the rotary impeller system requires calibration for a set of masses over closely spaced intervals. In addition, calibration over the full mass range is required for accurate results. Recalibration is also required under some conditions. This consumes time, promotes errors, and requires availability of calibration masses. Budgeting of time and weight are important considerations for spaceflight missions.

The rotary impeller system also has the disadvantage of not being adaptable to measuring items other than liquids. It particularly is not well suited for measuring the masses of solid items, especially if they are large.

Also, the physical sizes of both types of existing systems for use in microgravity are large. Obviously, that is a negative factor for many situations where mass must be measured. One spring mass system designed to operate in microgravity also requires significant additional equipment for it to be able to operate in a gravity environment as on Earth. Operation on Earth is very desirable for checkout, testing, and verification purposes.

The rotary impeller system is complex to operate and requires lengthy time interactions by the operator. The cycle time to perform a mass measurement is long. The equipment has difficulty removing all of a sample after a measurement, which will cause an error for the following sample measurement. It also has reduced accuracy for smaller samples. It is noisy and is designed such that it has poor maintainability, repairability, and reliability.

None of the existing systems in use under microgravity conditions perform multiple measurements for the masses of objects automatically to statistically enhance the accuracy of the measurements or to verify previous measurements of objects.

A need exists for a device which can measure mass that can operate in any gravitational field and that does not require extensive calibration or have limitations, disadvantages, or shortcomings of existing equipment.

SUMMARY OF THE INVENTION

To avoid the limitations and problems with the present devices and methods, the objective of this invention is to measure the masses of objects, whether animal (including human), plant, or mineral under all gravity environments. The invention is comprised of a platform where the object whose mass is to be measured is positioned. A torque restoring means is attached to the platform, such that if the platform is rotated from the equilibrium position, the torque restoring means provides a restoring torque. An actuator rotates the platform a definite angular amount from the equilibrium position and a sear mechanism holds the platform at that location and releases the platform. After the platform is released from the angular offset from equilibrium position, the dynamic combination of the torque restoring means and the masses of the platform and the object on the platform causes angular oscillation, or angular simple harmonic motion, to occur.

A position sensor detects a location on the platform and generates electrical signals representing the detection and nondetection of this location as the platform oscillates. A counter receives these signals and uses them to measure the time between said signals to determine the period of oscillation. A second actuator may be used to shift the location of the object and possibly part of the platform with respect to the center of rotation. The apparatus may include a controller for automatically controlling one or both of the actuators, as well as a processor for calculating the amount of mass using measured and stored information.

A technical advantage of the invention is that it may be used to measure the masses of objects in any gravitational field, including microgravity during space travel.

DETAILED DESCRIPTION OF THE INVENTION

Figure 1:
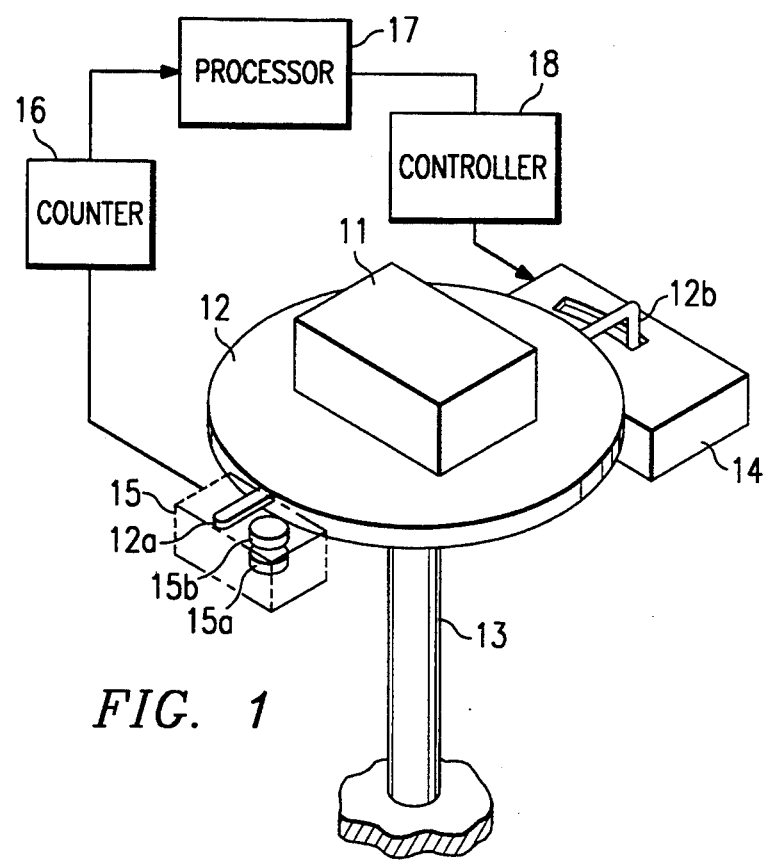
FIG. 1 illustrates a mass measurement system for measuring the mass of an object whose radius of gyration is known.
Figure 1A:
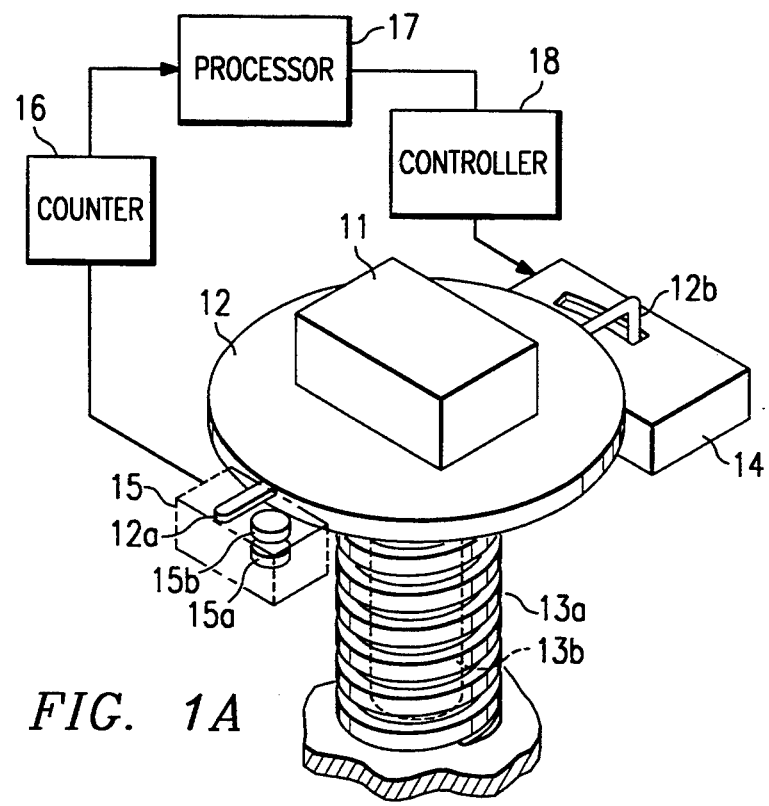
FIG. 1A illustrates the mass measurement system of FIG. 1, but with a torsion spring and a shaft rather than a torsion bar.

FIGS. 1 and 1A illustrate an object 11 of mass, m, on a platform 12. Object 11 is mounted on platform 12 in a manner such that object 11 will not move relative to platform 12 when it is rotated. Straps, clamps, or any variety of means (not shown) can be used for this purpose and the preferred type will depend upon the shape, size, and other external characteristics of the object to be measured. A perforated rubber cover works well when objects of irregular shapes are measured. Platform 12 may be any shape or size, with a common characteristic being that it provides a means to couple object 11 to torque restoring means 13.

Platform 12 is attached to one end of torque restoring means 13. A shaft or other structure may be interposed between platform 12 and torque restoring means 13, such that the attachment of torque restoring means 13 to platform 12 may be indirect or direct. In the example of FIG. 1, torque restoring means 13 is a torsion bar, which has one end attached to the bottom of platform 12 and the other end fixed. In the example of FIG. 1A, torque restoring means 13 is a torsion spring 13a wound around a rigid shaft 13b. Various torque restoring means 13 other than a torsion bar can be used, such as a type of flexure pivot (also called flexures, elastic joints, flexure strips, flexure bearings, plate fulcra springs, crossed flexure pivots, plate flexures, and other names). An important characteristic of torque restoring means 13 is that it suspends or supports platform 12 such that platform 12 is otherwise a rotationally "free body", that it permits platform 12 to oscillate at small angles, and that it provides a restoring torque if the end attached to platform 12 is rotated from its equilibrium position. One or more flexure pivots, which can be arranged in various configurations, is preferred for most anticipated applications because of the elimination of friction, slop or looseness, wear, and other factors associated with springs and couplings. Also, the flexure pivots can provide low spring constants so low oscillating frequencies can be obtained, which is desirable for the measurement of many objects. Regardless of the implementation of torque restoring means 13, it has a torsional spring constant, k.

Actuator 14 rotates platform 12 from its equilibrium position to an angular offset position, to a given angular displacement. Various mechanical means for rotating platform 12 can be used to implement the operations of actuator 14, such as a stepper motor, a lead or ball screw driven by a motor, a hydraulic or fluid actuator, or through external or manual operations.

Protrusion 12b is a projection of platform 12 that actuator 14 pushes against so platform 12 can be rotated the desired angular amount. Protrusion 12b and actuator 14 are shown to the side of platform 12 but can be under the platform, or at other locations, to reduce overall size and for other reasons. Included with actuator 14 is a latching mechanism with a spring-loaded sear which holds platform 12 in the offset position. Platform 12 becomes latched automatically by the sear and the operations of actuator 14 when platform 12 is rotated to the desired offset position. When actuator 14 reverses its motion, it moves to be clear of platform 12 and all of its attached parts and releases the sear automatically. When the sear is released, platform 12 and mass 11 oscillate freely (angular simple harmonic motion). The sear mechanism operates in a manner that platform 12 is released from the angular offset from equilibrium position such that no or minimal angular acceleration or torque is imparted to the platform. It is a trigger-like mechanism. There are many different ways that the sear can be set and released and that the platform can be held and released at its angular offset position.

The normal position (when it is not oscillating during the measurement operations) of platform 12 is in a latched condition at the angular offset from equilibrium position. Torque restoring means 13 has a very low spring constant. The latched condition makes it easier to install and remove objects from platform 12 (then, it is not free to oscillate and be unsteady). Also, the latched condition prevents sudden accidental movements of platform 12 and possible abuse to the parts. In addition, this saves time for the apparatus to perform its measurement cycle because platform 12 is more nearly prepared for release and to perform the measurement operations.

However, the apparatus can operate so that platform 12 is normally at the equilibrium location. Means are then required to hold platform 12 steady or it can start oscillating when that is not desired. The supporting means to hold the platform steady then has to be repositioned away from platform 12 for the measurement operations. The result is that parts of the apparatus can be more easily damaged from shock and vibration and there is greater difficulty in mounting and demounting objects on platform 12 or the apparatus is more complex because of the addition of means to support platform 12 during the appropriate times.

In the preferred embodiment, actuator 14 is automatically controlled by controller 18. Control signals are generated by processor 17.

Position sensor 15 detects another protrusion 12a on platform 12 and generates an electrical signal upon such detection. In the embodiment of FIG. 1, position sensor 15 is an optical sensing unit, having a fixed light source 15a and a fixed photodetector 15b that is in the path of light from source 15a. For this embodiment of sensor 15, platform 12 has an edge protrusion 12a, which passes between source 15a and detector 15b when platform 12 oscillates. An absence of light when protrusion 12a blocks detector 15b from receiving light from source 15a causes a change in the signal generated by detector 15b. The period of oscillation can be measured as a function of the interruptions of the light beam. Other means can be used for implementing sensor 15, such as non-contact sensors that sense a marker on platform 12 as it oscillates or use of a laser as the light source. Also, light source 15a and detector 15b can be combined or arranged to detect reflections from platform 12 or platform protrusion 12a. Protrusion 12a and sensor 15 are shown to the side of platform 12 but can be under the platform, or at other locations, to reduce overall size and for other reasons.

Counter 16 receives the output of position sensor 15. It measures the time between the signals, so the period of oscillation can be determined. The processor can be programmed to measure more than one period of oscillation so an average can be determined and/or start measuring after the platform has oscillated for a couple cycles. The delay before the start of measuring the period will allow conditions to better approach a steady state. The averaging and delay can then improve the accuracy.

Processor 17 provides automatic control for the mechanical operations of actuator 14 as well as processes and stores data. It receives a value representing the period of oscillation from counter 16. Its memory also stores calibration data. Processor 17 is programmed to calculate the mass of object 11 with an algorithm using the equations developed below. It has an output means to display measured mass values of objects and to provide operator prompts and other information.

Processor 17 can transfer data or instructions to or from external equipment, instruments, computers, data collection systems, or other items through parallel and serial ports. The interfacing capabilities can be used to download data from the apparatus in a format that is easier to transfer, analyze, and diagnose. This can expand the features and capabilities of the equipment.

The output of position sensor 15 can be utilized with processor 17, or other instruments, so that the apparatus can be leveled easily. For some conditions, such as higher gravity conditions, objects with larger mass values, or larger objects whose center of gravity is not collinear with the center of rotation, the apparatus should be oriented so the oscillation is perpendicular to the direction of gravity, or level.

The apparatus can be instructed to perform a succession of measurements of the mass of an object. Processor 17 can statistically analyze the measurements automatically to determine and provide additional information, such as the mean, range, standard deviation, accuracy probability, other measures of central tendency and dispersion, and other characteristics.

Figure 2:
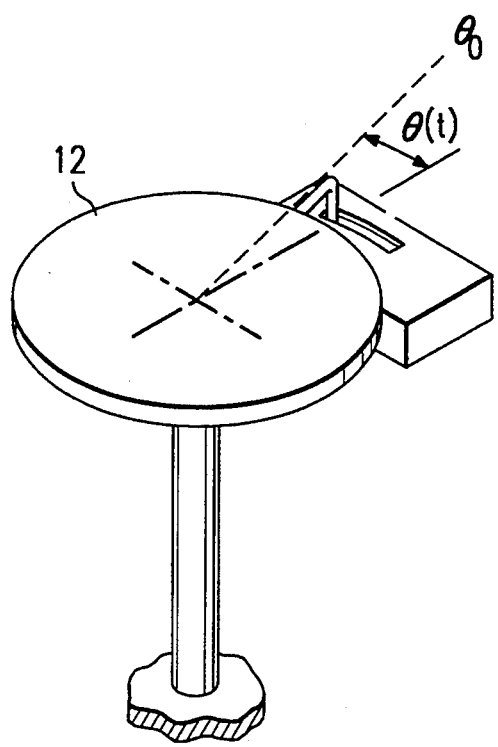
FIG. 2 illustrates the angular displacement of the platform from its equilibrium position.

FIG. 2 illustrates the angular displacement, $\theta(t)$, of platform 12 from its equilibrium position as caused by actuator 14. When platform 12 is displaced, the restoring torque, $\tau$, provided by torque restoring means 13 is proportional to the angular displacement and the torsional spring constant, k. This can be expressed as $$\tau = -k\theta. \tag{1}$$

From the angular analogy of Newton's second law of motion, the differential equation of motion is $$\tau = I \frac{d^2\theta}{dt^2} \tag{2}$$

where I is the mass moment of inertia of the oscillating body.

A general solution to the equation of motion, as a function of time, is $$\theta(t) = \theta_0 \cos \omega t \tag{3}$$

where $\theta_0$ is the angular offset of platform 12 from its equilibrium position at the initial conditions.

The natural circular frequency is given by $$\omega = \sqrt{\frac{k}{I}}. \tag{4}$$

Thus, the natural frequency of oscillation is $$f = \frac{\omega}{2\pi} = \frac{1}{2\pi} \sqrt{\frac{k}{I}}. \tag{5}$$

In general, the mass moment of inertia or mass rotational inertia of an arbitrary body can be expressed as $$I = mr^2 \tag{6}$$

where m is the mass of the body and r is its radius of gyration or radius of inertia.

After substituting Equation (6) into Equation (5) and rearranging, $$m = \frac{k}{(2\pi f r)^2}. \tag{7}$$

If the period of oscillation, T, is substituted for the reciprocal of the natural frequency, f, Equation (7) becomes $$m = k \left( \frac{T}{2\pi r} \right)^2. \tag{8}$$

So, if the effective radius of gyration for the combination of platform 12 and object 11 and the mass of platform 12 are known or can be determined, Equation (8) can be used to determine the value of the mass of object 11.

Now, consider the individual characteristics of object and platform 12 and derive the equations. Let I be the mass moment of inertia of object 11 and $I_t$ be the tare mass moment of inertia of platform 12 and its associated oscillating parts. Then, the differential equation of motion is $$T = (I_t + I) \frac{d^2\theta}{dt^2}. \tag{9}$$

Now, $$f = \frac{1}{2\pi} \sqrt{\frac{k}{I_t + I}} \tag{10}$$

and $$m = \frac{1}{r^2} \left[ \frac{k}{(2\pi f)^2} - I_t \right] \tag{11}$$

where m is the mass of object 11 and r is its radius of gyration.

If the period of oscillation is substituted for the reciprocal of the natural frequency, Equation (11) becomes $$m = \frac{1}{r^2}\left[k\left(\frac{T}{2\pi}\right)^2 - I_t\right]. \quad (12)$$

Equation (12) may be used to calculate the mass of object 11. There are two approaches, whose use depends on whether the radius of gyration of object 11 is known. Both involve placing object 11 on platform 12, which is allowed to oscillate with angular simple harmonic motion at its natural frequency.

Known Radius of Gyration of Object

For cases in which the effective radius of gyration of the combination of platform 12 and object 11 is difficult to obtain, Equation (12), which requires the radius of gyration of object 11 but not of platform 12, may be used. The tare mass moment of inertia of platform 12 and its attached parts can be easily determined by performing measurements with an empty platform 12, such that the unknown mass, m, of Equation (12) is 0. Alternatively, one or more calibration masses, whose values are known, can also be used to determine $I_t$.

The radius of gyration of object 12 can be determined by several techniques. Equipment is available for such measurements. Also, radii of gyration for certain standard objects can be obtained from tables and formulas. They can also be stored in processor 17.

Unknown Radius of Gyration of Object

Figure 3:
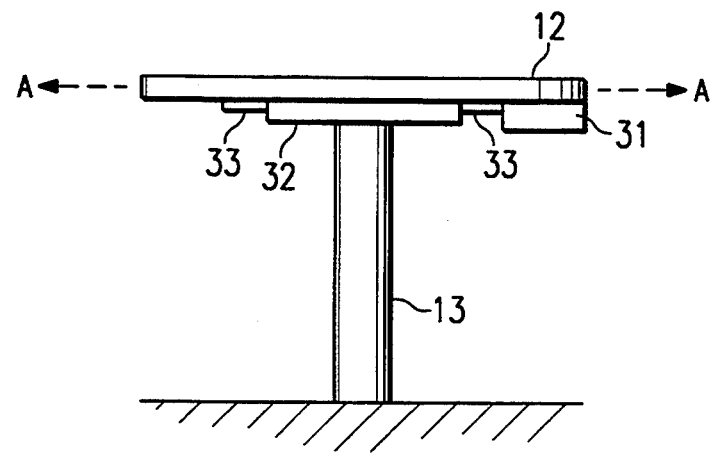
FIG. 3 illustrates the mass measurement system of FIG. 1 with the addition of an actuator for measuring the mass of an object whose radius of gyration is not known.

FIG. 3 is a side view of said platform 12 and torsion restoring means 13 as in FIG. 1. The apparatus of FIG. 3 has the same basic components as FIG. 1, but with the addition of a second actuator 31, which moves object 11 and some or all of platform 12 with respect to the center of rotation or axis of rotation. This displacement is referred to herein as "radial", as distinguished from the rotational displacement provided by actuator 14.

An example of the configuration with actuator 31 is the free end of torque restoring means 13 being attached to a first rail 32, inside of which is a second rail 33, which is attached to platform 12. Actuator 31 moves rail 33 with respect to rail 32, thereby moving platform 12 along a radial axis, A—A.

Figure 4:
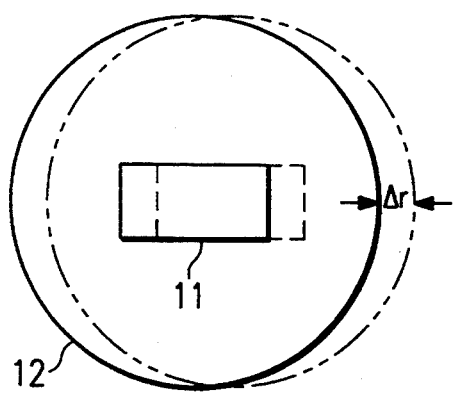
FIG. 4 illustrates the radial displacement of the object being measured and part of the platform.

In operation, actuator 31 moves platform 12 from a first position representing a first radial distance to the center of rotation to a second position representing a second radial distance to the center of rotation. The difference between these two radial distances is referred to herein as $\Delta r$ as shown schematically by FIG. 4, which is a top view of platform 12.

Like actuator 14, actuator 31 may be implemented with various known mechanical means for moving one body with respect to another, such as a stepper motor, a lead or ball screw driven by a motor, a hydraulic or fluid actuator, or other means. It is not necessary to move all of platform 12 or even any part of it. However, it is assumed that because of the need to attach object 11 to platform 12, the most convenient means for providing a $\Delta r$ is to radially displace at least some of platform 12 and some of its parts along with object 11.

Actuator 31 provides radial displacement which can be predetermined or measurable, with the value of $\Delta r$ being stored or supplied to processor 17. If the radial displacement is measured each time, a position sensor is used to provide the value of the displacement to processor 7. In the preferred embodiment, the radial displacement provided by actuator 31 is automatically controlled, such as by controller 18 or some other controller, so that the radial displacement is known and precisely repeated each time.

Using the parallel axis transformation of moments of inertia for the radial displacement, Equation (6) becomes $$I' = m(r^2 + \Delta r^2). \quad (13)$$

If $I'_t$ is the tare mass moment of inertia of platform 12 and its associated parts at the new location, and T' is the period of oscillation at the new location, Equation (12) becomes $$m = \frac{1}{r^2 + \Delta r^2}\left[k\left(\frac{T'}{2\pi}\right)^2 - I'_t\right]. \quad (14)$$

If Equations (12) and (14) are equated (the mass of object 11 did not change), $$\frac{1}{r^2 + \Delta r^2}\left[k\left(\frac{T'}{2\pi}\right)^2 - I'_t\right] = \frac{1}{r^2}\left[k\left(\frac{T}{2\pi}\right)^2 - I_t\right]. \quad (15)$$

Simplifying and rearranging, $$r^2\left[k\left(\frac{T'}{2\pi}\right)^2 - I'_t\right] = (r^2 + \Delta r^2)\left[k\left(\frac{T}{2\pi}\right)^2 - I_t\right] \quad (16)$$

$$r^2\left\{\frac{k}{(2\pi)^2}[(T')^2 - T^2] + I_t - I'_t\right\} = \quad (17)$$

$$\Delta r^2\left[k\left(\frac{T}{2\pi}\right)^2 - I_t\right]$$

$$r = \sqrt{\frac{\Delta r^2\left[k\left(\frac{T}{2\pi}\right)^2 - I_t\right]}{\frac{k}{(2\pi)^2}[(T')^2 - T^2] + I_t - I'_t}}. \quad (18)$$

Equation (18) can be substituted into Equation (12). The result provides a value of mass for object 11 because the values of T, T', $\Delta r$, k, $I_t$, and $I'_t$ can be measured or determined. The values of $I_t$ and $I'_t$ can be determined by the instrument through empty platform measurements or by calibration.

In operation, platform 12 with object 11 on it is released from its angular offset from equilibrium position so that it oscillates with a first period of oscillation, T. Then, actuator 14 rotates the platform and latches it, and actuator 31 provides radial displacement of platform 12 and object 11. Platform 12 is released from its offset position so that it oscillates with a second period of oscillation, T'.

A feature of the invention is that a number of period measurements for different radial displacements (provided by actuator 31) can be obtained. The additional measurements can be used by processor 17 to calculate mass statistically as an enhancement to accuracy, verify measurements by the regular mode of operation, obtain additional information about object 11, or for other reasons.

The apparatus can be instructed to perform empty platform measurements when it is turned on and/or at certain time intervals. An advantage of this feature is that drift errors are automatically corrected, which may be important when high accuracy is required, and the tare mass moment of inertia is not required to remain constant (there will be automatic compensations, or adjustments, for changes to it or spills of items on it).

The apparatus can be used in a simplified, but less efficient, manner wherein controller 18 and processor 17 are deleted. Then, the outputs of position sensor 15 would be measured by the counter or externally and the calculations would be performed external to the apparatus. The operations of actuators 14 and/or 31 can also be performed nonautomatically. For example, object 11 can be removed and repositioned radially on platform 12 by the operator (platform 12 does not move radially). In this case, the period of oscillation is measured at both radial locations, and Equations (12) and (18) are used as before, but $I_t$ does not vary ($I'_t = I_t$).

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An apparatus for measuring periods of oscillation for determining the masses of objects, comprising:
   a rotatable platform for holding the object whose mass is to be measured;
   a torque restoring means attached to said platform such that when said platform is rotated about an axis of rotation of said platform from an equilibrium position, said torque restoring means provides a restoring torque to said platform;
   an actuator for rotating said platform a definite angular displacement from said equilibrium position;
   a position sensor for detecting at least one point on said platform and for generating electrical signals representing the detection and nondetection of said point as said platform oscillates with respect to said position sensor; and
   a counter for receiving said electrical signals and for measuring the time between said signals.

2. The apparatus of claim 1, wherein said torque restoring means is a torsion shaft having one end attached to one side of said platform.

3. The apparatus of claim 1, wherein said torque restoring means is a torsion spring which has one end attached to one side of said platform.

4. The apparatus of claim 1, wherein said torque restoring means is one of a flexure pivot and a combination of flexure pivots with one side of said torque restoring means attached to one side of said platform.

5. The apparatus of claim 1, wherein said actuator has means for causing said platform to be latched and released at said angular displacement.

6. The apparatus of claim 1, wherein said position sensor is a light source and a light detector, and wherein said platform has a protrusion that blocks and unblocks the path of the light from said source to said detector as said platform oscillates.

7. The apparatus of claim 1, further comprising a processor for receiving the output of said counter, for storing data used to calculate said mass, and for calculating said mass based on said output and said data.

8. The apparatus of claim 7, wherein said processor further receives the output of said position sensor and for indicating whether said platform is level.

9. An apparatus for measuring periods of oscillation for determining the masses of objects, comprising:
   a platform for holding the object whose mass is to be measured;
   a torque restoring means attached to said platform such that when said platform is rotated from an equilibrium position, said torque restoring means provides a restoring torque to said platform;
   a rotational actuator for rotating said platform a definite angular displacement from said equilibrium position;
   a mounting means for movably attaching said platform to said torque restoring means such that said platform is radially displace with respect to the center of rotation of said platform;
   a position sensor for detecting at least one point on said platform and for generating electrical signals representing the detection and nondetection of said point as said platform oscillates with respect to said position sensor; and
   a counter for receiving said electrical signals and for measuring the time between said signals.

10. The apparatus of claim 9, wherein said torque restoring means is a torsion shaft having one end attached to one side of said platform.

11. The apparatus of claim 9, wherein said torque restoring means is a torsion spring which has one end attached to one side of said platform.

12. The apparatus of claim 9, wherein said torque restoring means is one of a flexure pivot and a combination of flexure pivots with one side of said torque restoring means attached to one side of said platform.

13. The apparatus of claim 9, wherein said rotational actuator has means for causing said platform to be latched and released at said angular displacement.

14. The apparatus of claim 9, wherein said position sensor is a light source and a light detector, and wherein said platform has a protrusion that blocks and unblocks the path of the light from said source to said detector as said platform oscillates.

15. The apparatus of claim 9, and further comprising a mechanism for radially displacing said platform with respect to its center of rotation.

16. The apparatus of claim 9, and further comprising a controller for automatically controlling said rotational actuator.

17. The apparatus of claim 9, and further comprising a processor for receiving the output of said counter, for storing data used to calculate said mass, and for calculating said mass.

18. A method of measuring masses of objects, comprising the steps of:
   rotating a platform, which is attached to a torque restoring means, an angular displacement about an axis of rotation of said platform so that said platform is offset from the equilibrium position of said platform;
   placing an object whose mass is to be measured on said platform;
   releasing said platform such that said platform is allowed to oscillate;
   measuring the period of oscillation of said platform to obtain an oscillation period value; and calculating the mass of said object, using said oscillation period value.

19. The method of claim 18, wherein said steps of rotating and releasing are performed manually.

20. The method of claim 18, wherein said steps of rotating and releasing are performed automatically with an actuator that engages said platform.

21. The method of claim 18, wherein said placing step is performed before said rotating step.

22. The method of claim 18, wherein said step of measuring the period of oscillation is performed by using a sensor to detect a point on said platform as said platform oscillates.

23. A method of measuring masses of objects, comprising the steps of:
rotating a platform, which is attached to a torque restoring means, an angular displacement so that said platform is offset from the equilibrium position of said platform;
placing an object whose mass is to be measured on said platform at a first radial displacement value from the center of rotation of said platform;
releasing said platform such that said platform is allowed to oscillate;
measuring the period of oscillation of said platform to obtain a first oscillation period value;
placing said object a distance, equal to a second radial displacement value from the center of rotation of said platform;
repeating said rotating, latching, releasing, and measuring steps, such that a second oscillation period value, which represents the period of oscillation for the different radius of gyration, is measured; and
calculating the mass of said object, using said first and said second oscillation period values and said radial displacement value.

24. The method of claim 23, wherein said steps of rotating and releasing are performed manually.

25. The method of claim 23, wherein said calculating step is performed by a processor.

26. The method of claim 23, wherein said steps of rotating, latching, and releasing said platform are performed automatically.

27. The method of claim 23, wherein said step of measuring the period of oscillation is performed by using a sensor to detect a point on said platform as said platform oscillates.

28. The method of claim 23, and further comprising the steps of repeating said rotating, latching, releasing, and measuring said platform without said object on said platform, to obtain the tare mass moment of inertia value of said platform.

29. The method of claim 23, wherein said steps of rotating and releasing are performed automatically with an actuator that engages said platform.

30. The method of claim 23, wherein said placing step is performed before said rotating step.

31. The method of claim 23, wherein said step of measuring the period of oscillation is performed by using a sensor to detect a point on said platform as said platform oscillates.

32. The method of claim 23, wherein all steps are repeated, and further comprising the step of analyzing the results of a number of calculations.

* * * * *

UNITED STATES PATENT AND TRADEMARK OFFICE
CERTIFICATE OF CORRECTION

PATENT NO. : 5,442,960

DATED : August 22, 1995

INVENTOR(S) : Ruell F. Solberg, Jr.

It is certified that error appears in the above-identified patent and that said Letters Patent is hereby corrected as shown below:

Col. 1, line 11, insert --GOVERNMENT RIGHTS CLAUSE

This invention was made with government support under Krug Life Sciences, Inc. purchase order number 5201. This purchase order was under a contract which Krug had with the National Aeronautics and Space Administration Johnson Space Center. The government has certain rights in the invention. --

Col. 7, line 66 -- delete reference numeral "7" and insert --17--.

Claim 9, col. 10, line 19, delete "displace" and insert -- displaced --.

Col. 11, line 33, delete "latching,".

Claim 23, col. 12, line 5, delete "value" and insert -- values --.

Claim 26, col. 12, line 11, delete "latching,".

Claim 28, col. 12, line 18, delete "latching,".

Claim 31, col. 12, delete lines 27-30 entirely, as Claim 31 is a duplicate of Claim 27.

Signed and Sealed this

Twelfth Day of August, 1997

*Attest:*

BRUCE LEHMAN

*Attesting Officer*   *Commissioner of Patents and Trademarks*